(12) United States Patent
Dupre (10) Patent No.: US 7,195,530 B2
(45) Date of Patent: Mar. 27, 2007

(54) SYSTEM AND METHODS TO INSTALL SUBSEA STRUCTURES

(75) Inventor: Michael Hosokawa Dupre, Houston, TX (US)

(73) Assignee: Shell Oil Company, Houston, TX (US)

(*) Notice: Subject to any disclaimer, the term of this patent is extended or adjusted under 35 U.S.C. 154(b) by 0 days.

(21) Appl. No.: 11/330,849

(22) Filed: Jan. 12, 2006

(65) Prior Publication Data

US 2006/0178063 A1   Aug. 10, 2006

Related U.S. Application Data

(60) Provisional application No. 60/644,075, filed on Jan. 14, 2005.

(51) Int. Cl.
*B63B 22/00*   (2006.01)
(52) U.S. Cl. .................................... 441/133
(58) Field of Classification Search .............. 441/1, 441/5, 133; 138/103, 129, 133
See application file for complete search history.

(56) References Cited

U.S. PATENT DOCUMENTS

| | | | |
|---|---|---|---|
| 3,121,130 A | 2/1964 | Wiley et al. ................. 264/53 |
| 4,119,122 A | 10/1978 | de Putter .................... 138/103 |
| 4,764,137 A * | 8/1988 | Schulte ....................... 441/133 |
| 6,663,453 B2 * | 12/2003 | Quigley et al. ............. 441/133 |
| 6,688,930 B2 * | 2/2004 | Cottrell et al. ................ 441/5 |
| 2004/0003856 A1 | 1/2004 | Quigley et al. ............... 138/98 |

FOREIGN PATENT DOCUMENTS

| | | |
|---|---|---|
| DE | 10007772 A1 | 8/2001 |
| FR | 2011566 | 3/1970 |
| WO | 94/19639 | 9/1994 |
| WO | 00/22330 | 4/2000 |
| WO | 00/75546 | 12/2000 |

OTHER PUBLICATIONS

Written Opinion dated Jun. 30, 2006, PCT/US2006/001069.
International Search Report dated Jun. 30, 2006, PCT/US2006/001069.

* cited by examiner

*Primary Examiner*—Lars A. Olson
(74) *Attorney, Agent, or Firm*—William E. Hickman

(57) ABSTRACT

There is disclosed a system comprising a structure in a body of water, wherein the body of water comprises a depth comprising a top-section from a surface of the body of water to one-third of the depth, and a second-section from one-third of the depth to two-thirds of the depth, a first buoyant apparatus attached to the structure in the top-section of the depth, a second buoyant apparatus attached to the structure in the second-section of the depth, wherein the second buoyant apparatus provides a second buoyancy effect average per length of the structure at least 30% less than a first buoyancy effect average per length of the structure provided by the first buoyant apparatus.

29 Claims, 9 Drawing Sheets

SYSTEM AND METHODS TO INSTALL SUBSEA STRUCTURES

This application claims the benefit of U.S. Provisional Application No. 60/644,075 filed Jan. 14, 2005 the entire disclosure of which is hereby incorporated by reference.

FIELD OF INVENTION

The present disclosure relates to systems and methods for installing structures in a body of water.

BACKGROUND

Structures can be installed at sea from a floating vessel using either a J-lay configuration where the structure is held vertically on the vessel and dropped vertically into the water and then when it reaches the bottom of the body of water, it lays horizontal, or structures can be installed in a S-lay configuration where the structure is held horizontally on the vessel, drops to the vertical through the body of water, and then rests on the bottom of the body of water in a horizontal configuration. Other configurations for installing a structure from a vessel in a body of water are also known. One limitation on installing such structures in a body of water is the buoyancy of the vessel and the capacity of the tensioner on the vessel to hold the structure, so that the structure is not released into the body of water and does not sink to the bottom.

As oil pipelines have been installed on the bottom of a body of water, as the weight of the pipelines increases and with an increasing depth of the body of water, the capacity of the buoyancy of vessels and the tensioners of vessels is being reached.

Figure 1:
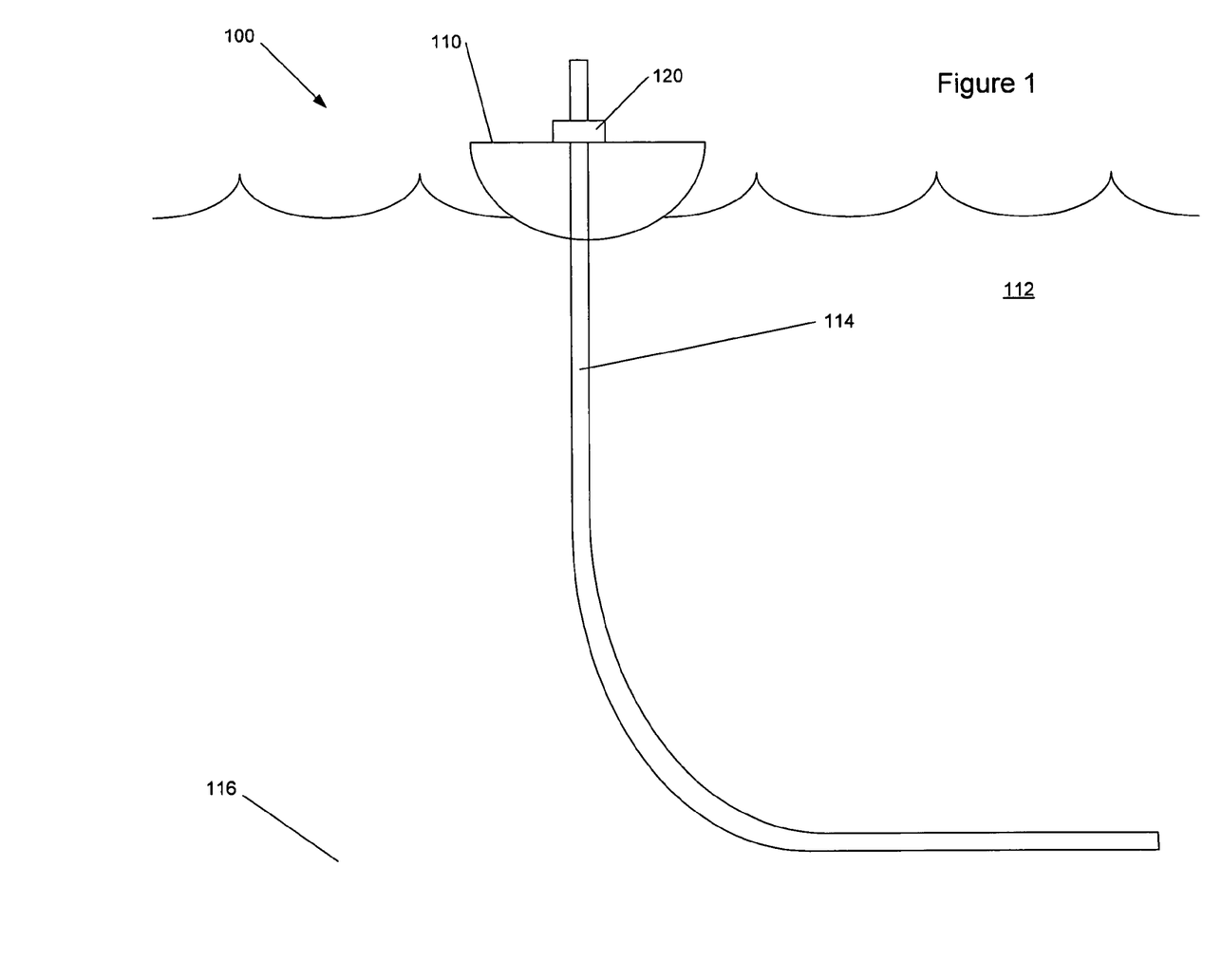
FIG. 1 illustrates a prior art system for installing a structure in a body of water in a J-lay configuration.

Referring now to FIG. 1, a view of a prior art system 100 for installing a structure 114 in body of water 112 is illustrated. System 100 includes vessel 110 with tensioner 120 which is holding structure 114. Structure 114 is being installed on the bottom 116 of body of water 112. Vessel 110 and tensioner 120 keep structure in a vertical configuration when entering the water, and if tensioner 120 were to fail or if vessel 110 to sink, structure 114 would sink to the bottom 116. Vessel 110 and tensioner 120 must have a sufficient capacity to support structure 114 so that it can be installed on bottom 116 in a desired manner.

Figure 2:
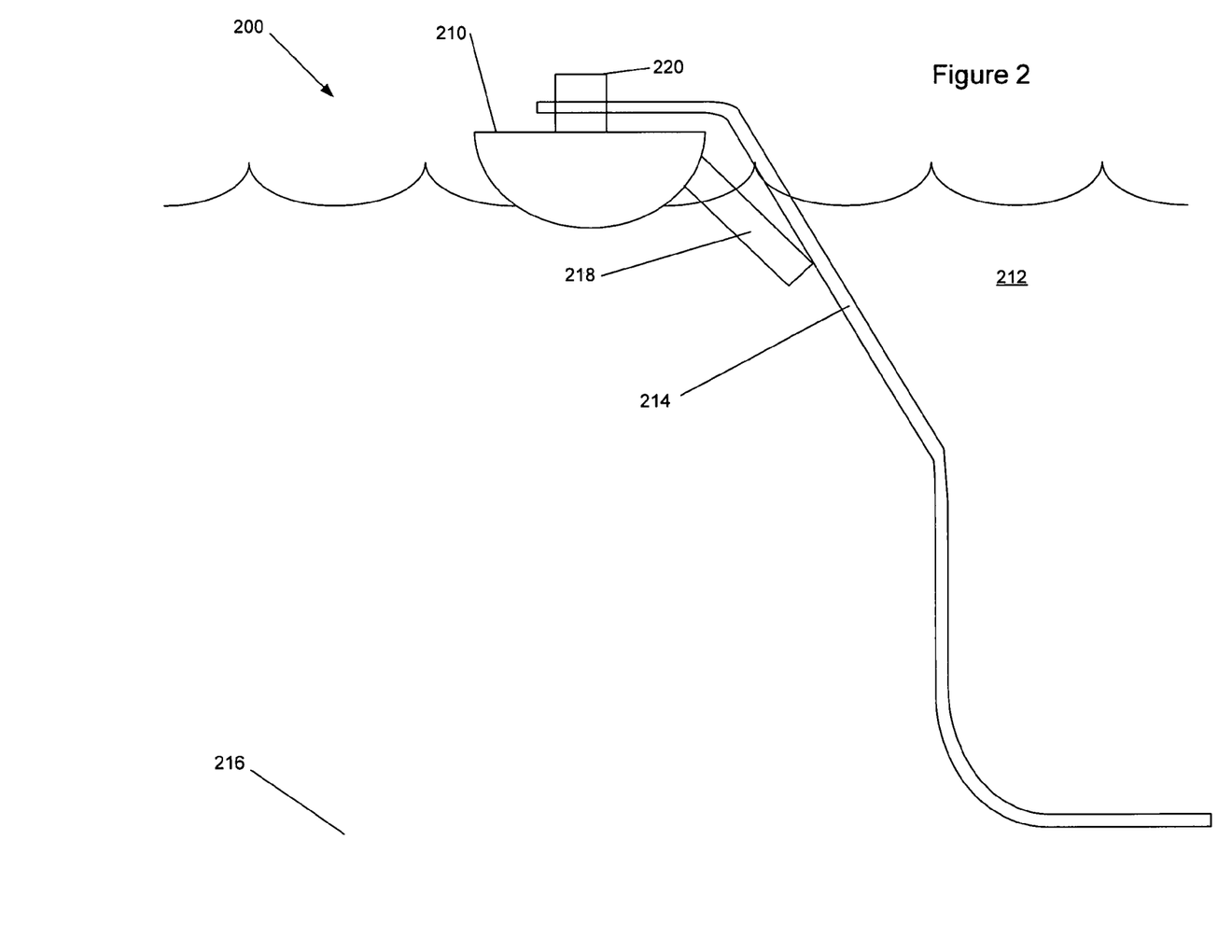
FIG. 2 illustrates a prior art system for installing a structure in a body of water in an S-lay configuration.

Referring now to FIG. 2, prior art system 200 for installing structure 214 on bottom 216 of body of water 212 is illustrated. System 200 includes vessel 210 with tensioner 220 and stinger 218. Tensioner 220 holds structure 214 in a horizontal configuration as it enters water, and then structure 214 drops to a vertical configuration, and then back to a horizontal configuration as it lays on bottom 216. Tensioner 220 and vessel 210 must have a sufficient capacity to support structure 214 as it is being installed.

It can be seen from FIGS. 1 and 2 that as the weight of structures 114 and 214 increases, and as the depth of water 112 and 212 increase, there is a need for an increased capacity of vessels 110 and 210 and tensioners 120 and 220.

In deep water applications, for example greater than about 1000 or 2000 meters of depth, there are few vessels that have sufficient capacity to install oil flowlines and other structures. In addition, as the depths of the water increases, the capacity of the vessels must also increase, which leads to increased installation cost, because in general, a vessel with a larger capacity also costs more.

In one example, referring again to FIG. 1, to install a 8.625 inch by 12.75 inch pipe-in-pipe oil flowline structure 114 in 3050 meters of water, a top tension (if structure 114 is dry) is 6780 kN, and if structure 114 becomes flooded, 8510 kN of tension are needed by tensioner 120 to keep structure 114 near vertical (for example a 7° top angle). There are only a small number of vessels that are able to provide such tension, for example, the Heerema Balder in J-lay can provide 10,275 kN of tension. However, at the end of structure 114, a cable is often attached for the abandon and recover procedure to lower structure 114 to the bottom 116. The Heerema Balder's abandon and recover capacity is only 6,850 kN. Therefore, if structure 114 is flooded, and 8510 kN are needed, the Heerema Balder would be unable to complete the installation. In this example, the 8.625 inch by 12.75 inch pipe-in-pipe oil flowline has a weight of 70 kilograms per meter dry and 90 kilograms per meter flooded.

CRP Group Inc. of Houston, Tex., sells pipeline installation buoys, which buoyancy modules can be strapped to a pipeline on board the vessel prior to lowering the pipeline into the water. These buoyancy modules are often released and recovered, for example, with a diver, an ROV, or an acoustic release mechanism. For shallow water applications, the buoyancy modules are filled with a high density polyurethane foam. For mid-water and deepwater pipeline buoyancy modules, a syntactic foam may be used.

Generally, a polyolefin foam, for example, polyethylene may be used in depths up to about 100 meters for buoyancy or insulation applications. A polyurethane foam may also be used in depths up to about 100 meters. Polyurethane foam generally has a density of about 50 to 250 kilograms per meter cubed, with a higher density foam required for deeper water applications.

Co-polymer foams can be used at depths up to 600 or even up to 1000 meters, and have densities of 40 to 400 kilograms per meter cubed.

Syntactic foams are used for installation and buoyancy applications in deeper waters. Syntactic foams are manufactured by placing microspheres of hollow glass or other materials in a polymer matrix. Syntactic foams can be used at depths up to 3000 meters, up to 4000 meters, or more, and have densities of 275 to 650 kilograms per meter cubed.

Generally, with all kind of foams, a higher density foam is required for deeper water applications.

There is a need in the art for systems and/or methods to efficiently install structures in a body of water.

SUMMARY OF THE INVENTION

One aspect of the invention includes a system comprising a structure in a body of water, wherein the body of water comprises a depth comprising a top-section from a surface of the body of water to one-third of the depth, and a second-section from one-third of the depth to two-thirds of the depth, a first buoyant apparatus attached to the structure in the top-section of the depth, a second buoyant apparatus attached to the structure in the second-section of the depth, wherein the second buoyant apparatus provides a second buoyancy effect average per length of the structure at least 30% less than a first buoyancy effect average per length of the structure provided by the first buoyant apparatus.

Another aspect of the invention includes a method of installing a structure in a body of water comprising attaching a first buoyant apparatus to a first portion of the structure, attaching a second buoyant apparatus to a second portion of the structure, lowering the second portion into the body of water, wherein the body of water comprises a depth comprising a top-section from a surface of the body of water to one-third of the depth, and a second-section from one-third of the depth to two-thirds of the depth, lowering the second portion into the second-section of the depth, lowering the first portion into the top-section of the depth, wherein the second buoyant apparatus provides a second buoyancy effect average per length of the structure at least 30% less than a first buoyancy effect average per length of the structure provided by the first buoyant apparatus.

Another aspect of the invention includes an apparatus for installing a structure in a body of water, comprising a means for attaching a first buoyant means to a first portion of the structure, a means for attaching a second buoyant means to a second portion of the structure, a means for lowering the second portion into the body of water, wherein the body of water comprises a depth comprising a top-section from a surface of the body of water to one-third of the depth, and a second-section from one-third of the depth to two-thirds of the depth, a means for lowering the second portion into the second-section of the depth, a means for lowering the first portion into-the top-section of the depth, wherein the second buoyant means provides a second buoyancy effect average per length of the structure at least 30% less than a first buoyancy effect average per length of the structure provided by the first buoyant means.

Advantages of the invention include one or more of the following:

DETAILED DESCRIPTION OF THE INVENTION

Figure 3:
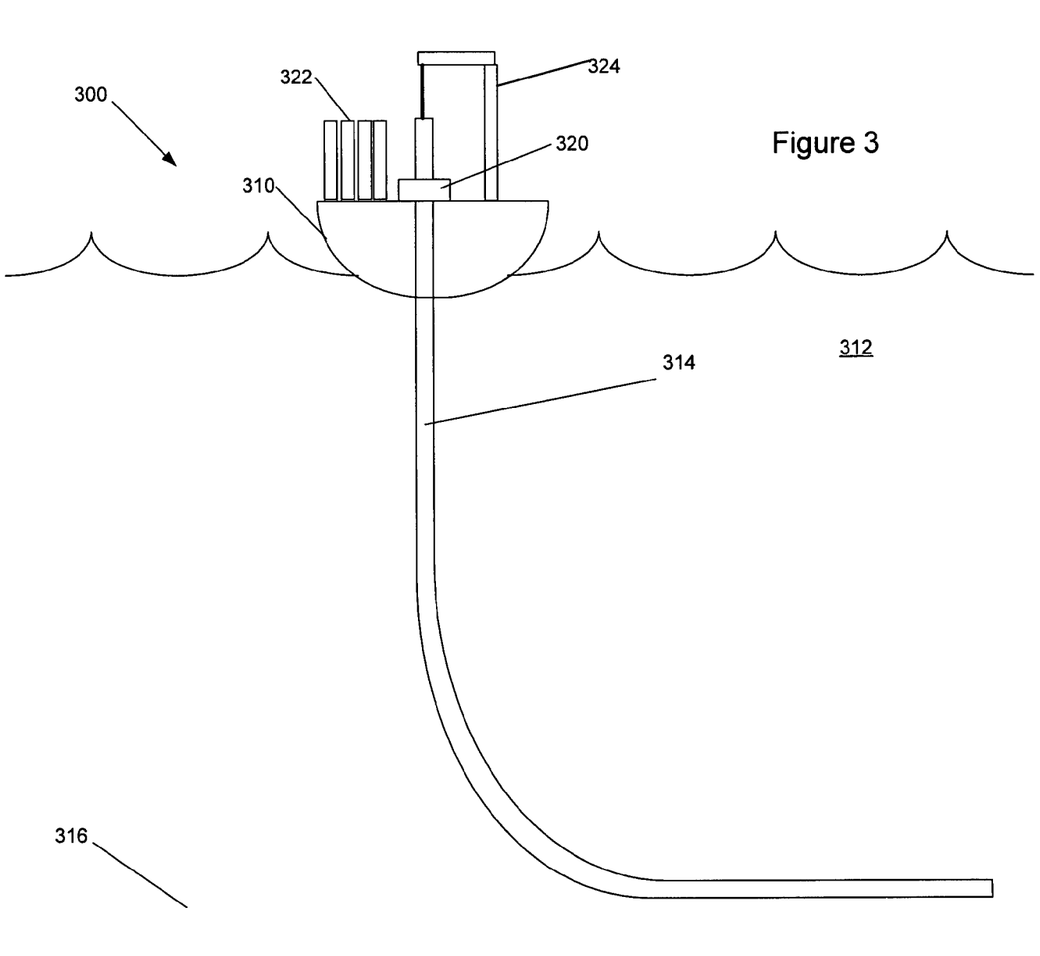
FIG. 3 illustrates a system for installing a structure in a body of water.

Referring now to FIG. 3, in one embodiment of the invention, System 300 is illustrated. System 300 includes vessel 310 in body of water 312, installing structure 314 in body of water 312 and resting a portion of structure 314 on bottom 316. Vessel 310 may include tensioner 320 to keep tension on structure 314 so that it doesn't sink in water 312. Lift 324 may be used to place sections 322 on top of existing structures 314, where sections 322 may be welded, or threaded, or otherwise attached, to existing structure 314.

Figure 4:
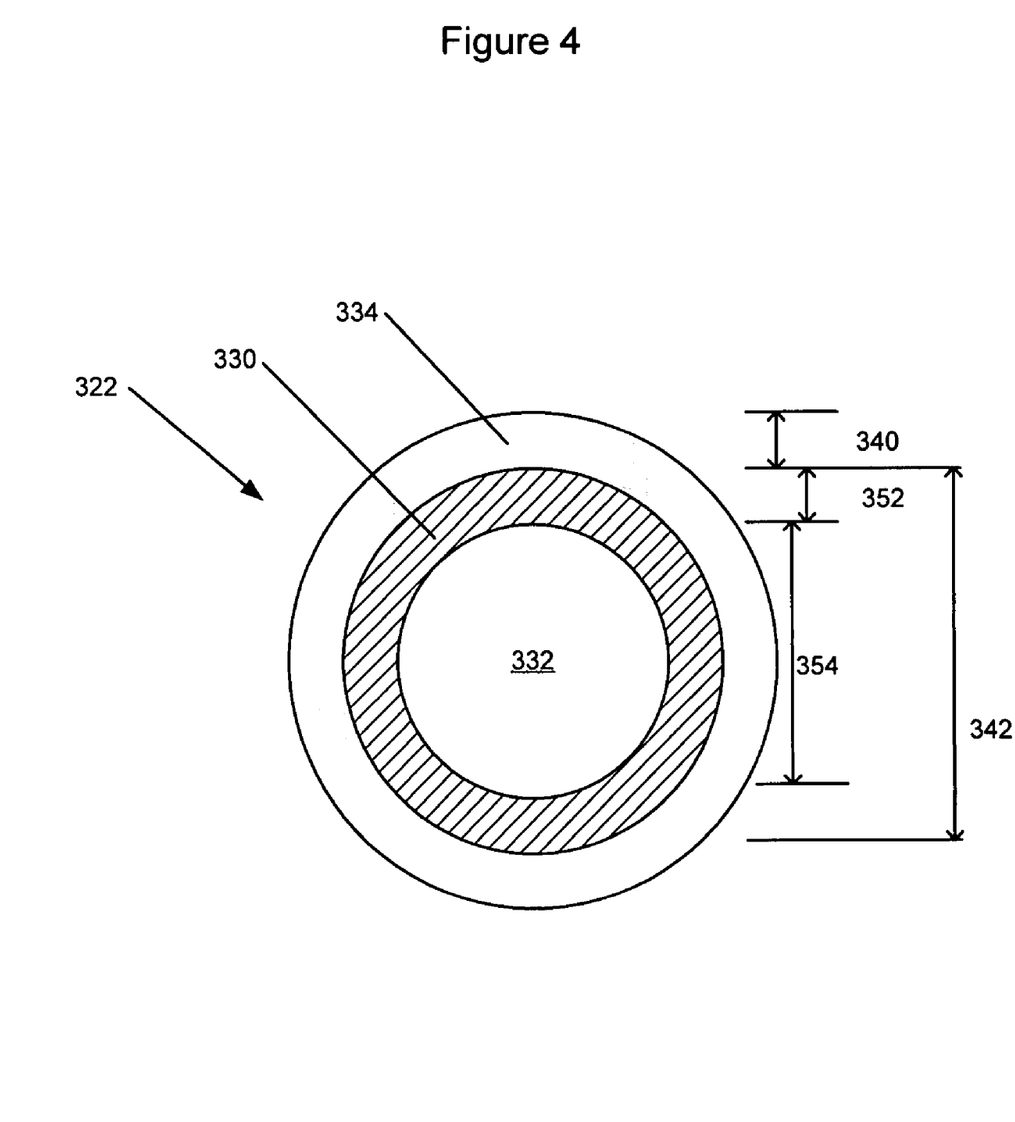
FIG. 4 illustrates a cross-sectional end view of a section of a structure.

Referring now to FIG. 4, in some embodiments, section 322 is illustrated. Section 322 may include pipe 330 defining passage 332. Foam 334 is about a circumference of pipe 330. Foam 334 may have thickness 340. Pipe 330 may have inside diameter 354, outside diameter 342, and wall thickness 352.

Figure 5:
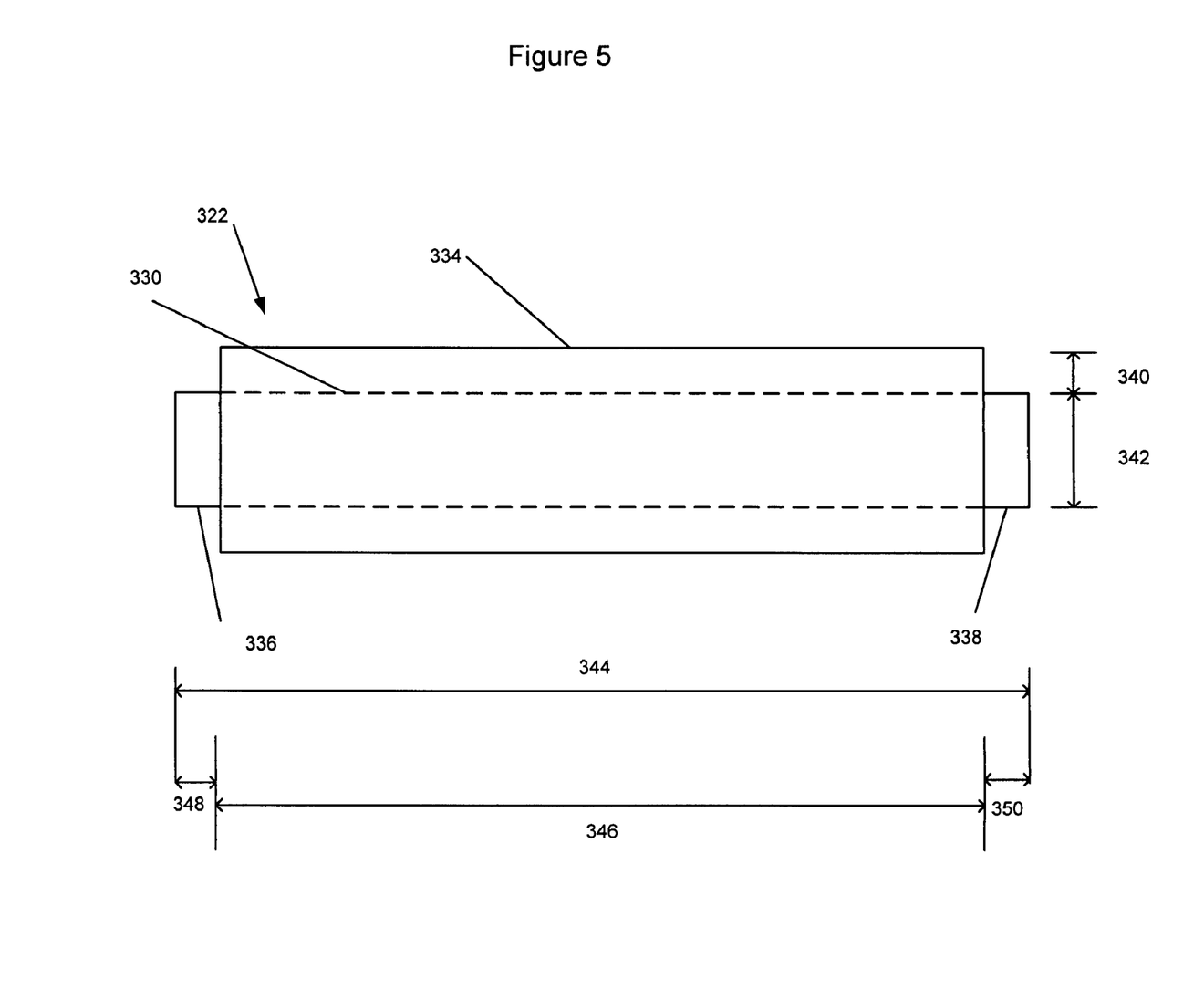
FIG. 5 illustrates a side view of a section of a structure.

Referring now to FIG. 5, in some embodiments, section 322 is illustrated. Section 322 may include pipe 330 having foam 334 about its circumference for foam length 346. Pipe length 344 may be longer than foam length 346 leaving exposed first pipe end 336 and second pipe end 338. First pipe end 336 has end length 348, and second pipe end 338 has end length 350. Pipe 330 has diameter 342, and foam 334 has thickness 340.

Figure 6:
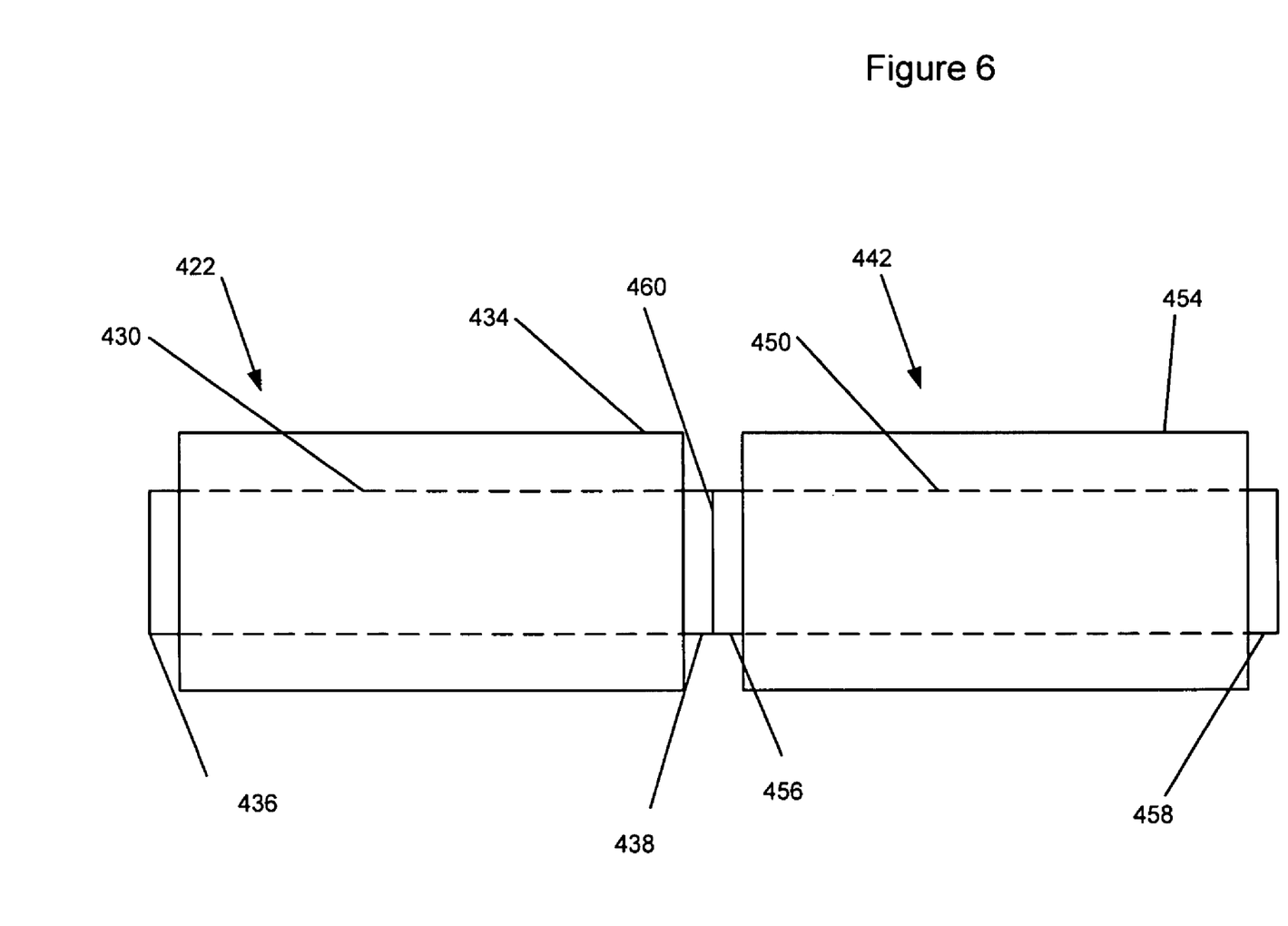
FIG. 6 illustrates two adjacent sections of a structure connected to each other.

Referring now to FIG. 6, in some embodiments, section 422 may be connected to section 442. Section 422 has pipe 430 with foam 434 about its exterior, with first pipe end 436 and second pipe end 438. Section 442 has pipe 450 with foam 454 about its exterior, but foam does not cover first pipe end 456 and second pipe end 458. To attach section 422 to section 442, second pipe end 438 may be aligned with first pipe end 456, and then a connection 460 may be made between section 422 and section 442, for example, a weld, a threaded connection, or another suitable mechanical connection.

In some embodiments, section 322 may include passage 332 defining an interior of section 322, pipe 330 exterior to passage 332, and foam 334 exterior to pipe 330 and passage 332. In some embodiments, section 322 also may include skin, shell, or second pipe exterior to foam 334, pipe 330, and passage 332. Foam 334, may be a polyolefin foam, polyethylene foam, polyurethane foam, a copolymer foam, or any other suitable foam having a density less than water to provide a buoyancy effect to section 322. Skin, shell, or second pipe may be any suitable material, for example, same material as foam 334, or a different material which provides more structural integrity and/or strength to foam 334.

In some embodiments, foam 334 has a density less than about 500 kilograms per meter cubed, or less than about 250 kilograms per meter cubed, or less than about 100 kilograms per meter cubed, or less than about 75 kilograms per meter cubed.

In some embodiments, foam 334 may be manufactured from a base material having a density less than water.

Suitable foams and/or methods of manufacturing foams and/or extruding foams are disclosed in WO 00/75546; U.S. Pat. No. 3,121,130; U.S. Pat. No. 4,119,122; and/or U.S. publication No. 2004/0003856, the entire disclosures of which are herein incorporated by reference in their entirety.

In operation, in some embodiments, vessel 310 may be in water 312, with sections 322, on board. Each section 322 may include pipe 330 and foam 334 about its exterior, with an optional skin, or exterior pipe to increase the strength of foam 334. Each section 334 may be lifted by lift 324, and feed through tensioner 320. As structure 314 is lowered by tensioner 320, a section may be lifted, and then attached to existing structure 314. Additional sections are attached and lowered until structure 314 has desired length. In some embodiments, structure 314 may be lowered onto bottom 316 of water 312. In some embodiments, water 312 has a depth of at least about 1000 meters, at least about 2000 meters, at least about 3000 meters, or at least about 4000 meters. In some embodiments, water 312 has a depth up to about 10,000 meters.

In some embodiments, foam 334 may be crushed at a depth of about 100 meters, about 500 meters, or about 1000 meters. In some embodiments, foam 334 provides buoyancy to section 322 until foam is crushed, prior to reaching bottom 316. In some embodiments, foam 334 is crushed at a depth less than the depth of water 312.

In some embodiments, foam 334 may be lowered to a depth greater than 1.5 times its rated operating depth, greater than two times it rated operating depth, greater than three times its rated operating depth, or greater than about five times its rated operating depth. Operating depth is defined herein as the depth at which foam 334 loses at least 50% of its buoyancy effect.

In some embodiments, foam 334 comprises a polyethylene foam with a polyethylene skin. In some embodiments, foam 334 comprises a polyethylene foam with a polyurethane skin. In some embodiments, foam 334 comprises a polyurethane foam with a polyurethane skin. In some embodiments, foam 334 comprises a copolymer foam with a copolymer skin. In some embodiment, foam 334 comprises a polyethylene or polyurethane foam surrounded by a PVC pipe.

In some embodiments, crushed foam 334 may provide an insulating effect to structure 314 in water 312.

In some embodiments of the invention, structure 314 may be a pipeline, a crude oil flowline, a mooring line, a riser, a tubular, or any other structure installed in a body of water. In some embodiments, structure 314 may have a diameter of about 0.1 to about 5 meters, and a length of about 10 to about 200 kilometers (km). In some embodiments, structure 314 may have a length to diameter ratio of about 100 to about 100,000. In some embodiments, structure 314 may be composed of about 50 to about 30,000 tubular sections, each with a diameter of about 10 cm to about 60 cm and a length of about 5 m to about 50 m, and a wall thickness of about 0.5 cm to about 5 cm.

Figure 7:
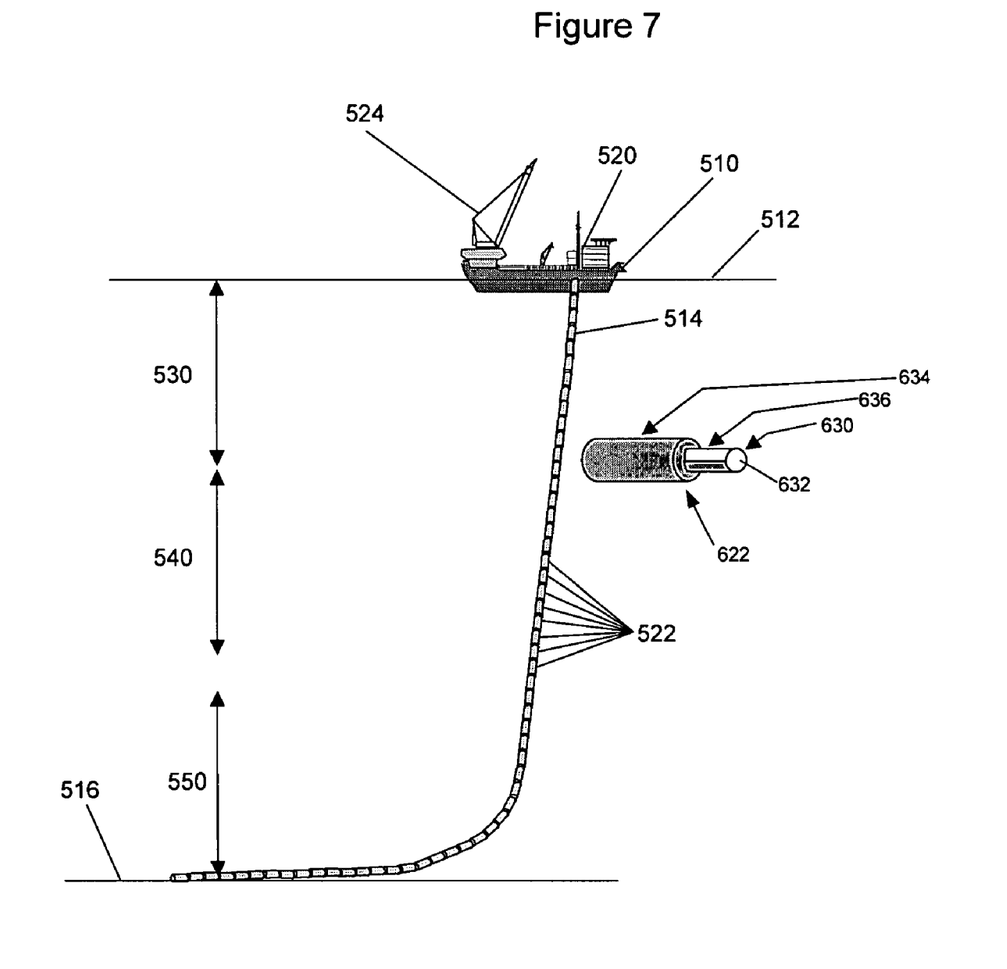
FIG. 7 illustrates a system for installing a structure in a body of water.

Referring now to FIG. 7, in one embodiment of the invention, System 500 is illustrated. System 500 includes vessel 510 in body of water 512, installing structure 514 in body of water 512 and resting a portion of structure 514 on bottom 516. Vessel 510 may include tensioner 520 to keep tension on structure 514 so that it doesn't sink in water 512. Lift 524 may be used to place a section 522 on top of existing structure 514, where sections 522 may be welded, or threaded, or otherwise attached, to existing structure 514. Sections 522 may have a buoyant mechanism attached to them.

Water 512 has a depth measured from the surface to the bottom 516. In region 530, from the surface to about one-third of the total depth, buoyant mechanism may provide the greatest effect to reduce the load on vessel 510 and/or tensioner 520, by providing a buoyancy effect to structure 514.

In region 540, from about one-third to about two-thirds of the total depth, buoyant mechanism may provide a reduced buoyant effect to reduce the load on vessel 510 and/or tensioner 520, by providing a reduced buoyancy effect to structure 514. In some embodiments, the buoyancy effect from region 540 is at least about one-third less than the buoyancy effect from region 530.

In region 550, from about two-thirds to bottom 516 of the total depth, buoyant mechanism may provide a more reduced buoyant effect to reduce the load on vessel 510 and/or tensioner 520, by providing a more reduced buoyancy effect to structure 514. In some embodiments, the buoyancy effect from region 550 is at least about 90% less than the buoyancy effect from region 530.

In some embodiments, region 530 may be a depth of 0 to about 500 meters, with a buoyancy effect on structure 514 of about 100 kN. Region 540 may be a depth of about 500 to about 1000 meters, with a buoyancy effect on structure 514 of about 60 kN, 40% less than buoyancy effect from region 530. Region 550 may be a depth of about 1000 to about 1500 meters, with a buoyancy effect on structure 514 of less than about 5 kN, at least 95% less than buoyancy effect from region 530.

In some embodiments, region 530 may have a depth range from about 0–300 to about 0–2000 meters; region 540 may have a depth range from about 300–600 to about 2000–4000 meters; and region 550 may have a depth range from about 600–900 to about 4000–6000 meters. For example, region 530 may have a depth range of about 0–1000 meters; region 540 may have a depth range of about 1000–2000 meters; and region 550 may have a depth range of about 2000–3000 meters.

In some embodiments, suitable section 622 is illustrated. Section 622 may include pipe 630 defining passage 632. Coating 636 may be about a circumference of pipe 630. Foam 634 may be about a circumference of pipe 630 and/or coating 636.

Figure 8:
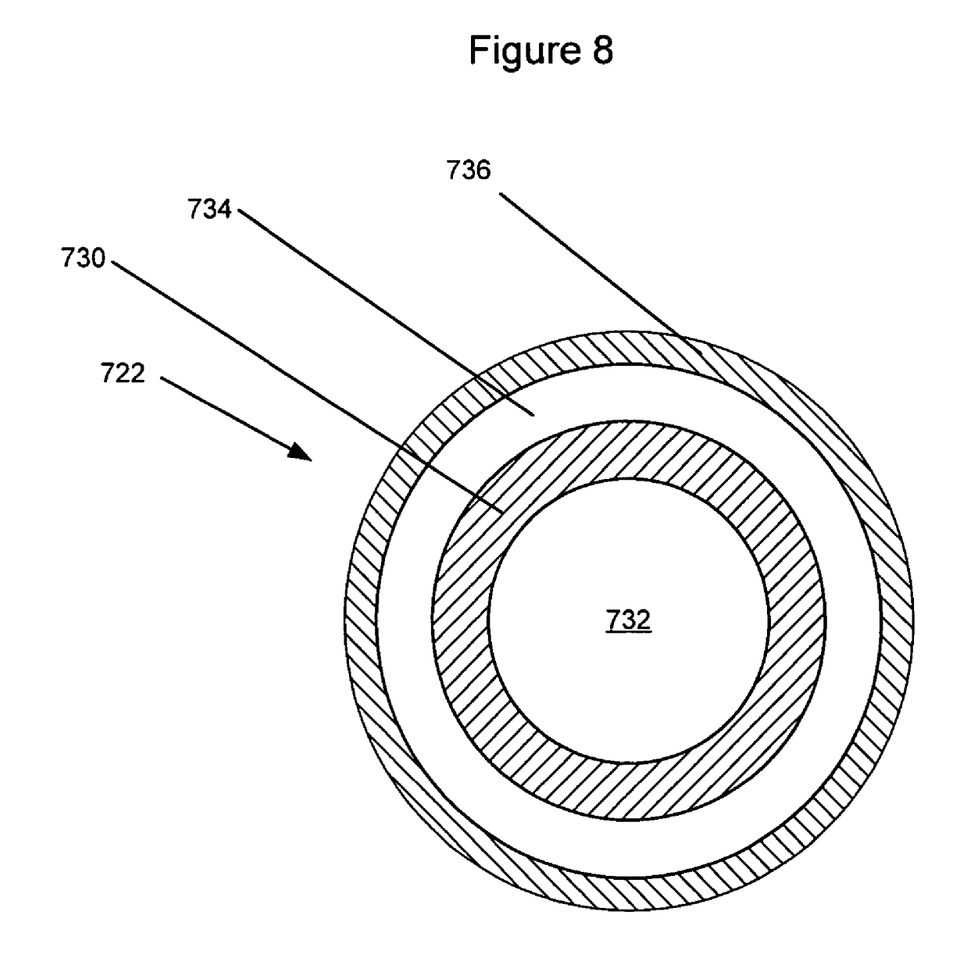
FIG. 8 illustrates a cross-sectional end view of a section of a structure.

Referring now to FIG. 8, in some embodiments, suitable section 722 is illustrated. Section 722 may include pipe 730 defining passage 732. Foam 734 may be about a circumference of pipe 730. Foam support structure 736 may be about a circumference of foam 734. In some embodiments, foam support structure 736 may be a polymer skin, a polymer or metal pipe, a coating, or another suitable structure to protect foam 734.

Figure 9:
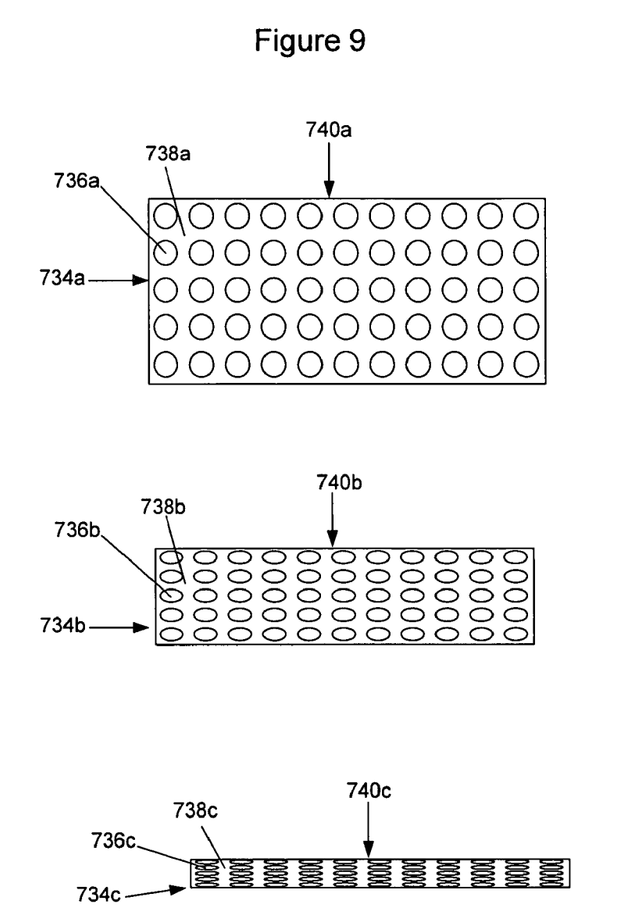
FIG. 9 illustrates the effects of pressure on a foam.

Referring now to FIG. 9, in some embodiments, foam is illustrated. Foam 734a includes closed cells 736a in a matrix 738a. Cells 736a may include a trapped gas, for example air. Matrix 738a may be a polymer, for example a polyolefin, such as polyethylene, or polyurethane. Pressure 740a is acting on foam 734a.

In some embodiments, pressure 740b is greater than pressure 740a, and is acting on foam 734b. Foam 734b includes closed cells 736b in a matrix 738b. Pressure 740b compresses foam 734b to a reduced volume and/or bursts cells 736b, which may cause foam 734b to have a higher density and/or a reduced buoyancy effect compared to foam 734a.

In some embodiments, pressure 740c is greater than pressure 740a and 740b, and is acting on foam 734c. Foam 734c includes closed cells 736c in a matrix 738c. Pressure 740c compresses foam 734c to a reduced volume and/or bursts cells 736c, which may cause foam 734c to have a higher density and/or a reduced buoyancy effect compared to foams 734a and 734b.

In some embodiments, there is disclosed a system comprising a structure in a body of water, wherein the body of water comprises a depth comprising a top-section from a surface of the body of water to one-third of the depth, and a second-section from one-third of the depth to two-thirds of the depth, a first buoyant apparatus attached to the structure in the top-section of the depth, a second buoyant apparatus attached to the structure in the second-section of the depth, wherein the second buoyant apparatus provides a second buoyancy effect average per length of the structure at least 30% less than a first buoyancy effect average per length of the structure provided by the first buoyant apparatus. In some embodiments, the system also includes a vessel connected to the structure, wherein the vessel is floating in the body of water. In some embodiments, the structure is selected from the group consisting of an oil flowline, a pipeline, a riser, and a steel tubular. In some embodiments, at least one of the first buoyant apparatus and the second buoyant apparatus comprises a polymeric foam. In some embodiments, the system also includes a polymeric skin exterior to the foam. In some embodiments, the structure comprises a plurality of sections welded to each other. In some embodiments, the structure comprises a plurality of sections threaded to each other. In some embodiments, at least one of the first buoyant apparatus and the second buoyant apparatus comprises foam having a thickness of at least 10 cm. In some embodiments, the first and the second buoyant apparatus provide a substantially equivalent buoyancy when both the first and the second buoyant apparatus are at the same depth, for example within about 20% of each other, or within about 10% of each other.

In some embodiments, there is disclosed a method of installing a structure in a body of water comprising attaching a first buoyant apparatus to a first portion of the structure, attaching a second buoyant apparatus to a second portion of the structure, lowering the second portion into the body of water, wherein the body of water comprises a depth comprising a top-section from a surface of the body of water to one-third of the depth, and a second-section from one-third of the depth to two-thirds of the depth, lowering the second portion into the second-section of the depth, lowering the first portion into the top-section of the depth, wherein the second buoyant apparatus provides a second buoyancy effect average per length of the structure at least 30% less than a first buoyancy effect average per length of the structure provided by the first buoyant apparatus.

In some embodiments, a top of the second-section depth is at least about 1000 meters. In some embodiments, the structure is selected from the group consisting of an oil flowline, a pipeline, a riser, and a steel tubular. In some embodiments, at least one of the first buoyant apparatus and the second buoyant apparatus comprise a polyolefin foam having a thickness of at least about 15 cm. In some embodiments, at least one of the first buoyant apparatus and the second buoyant apparatus comprises a foam having a thickness of at least about 20 cm. In some embodiments, at least one of the first buoyant apparatus and the second buoyant apparatus comprises a foam having a thickness of at least about 30 cm. In some embodiments, the method also includes a skin or a pipe exterior to the foam, the skin adapted to provide additional strength to the foam. In some embodiments, at least a portion of the structure rests on a bottom of the body of water.

In some embodiments, there is disclosed an apparatus for installing a structure in a body of water, comprising a means for attaching a first buoyant means to a first portion of the structure, a means for attaching a second buoyant means to a second portion of the structure, a means for lowering the second portion into the body of water, wherein the body of water comprises a depth comprising a top-section from a surface of the body of water to one-third of the depth, and a second-section from one-third of the depth to two-thirds of the depth, a means for lowering the second portion into the second-section of the depth, a means for lowering the first portion into the top-section of the depth, wherein the second buoyant means provides a second buoyancy effect average per length of the structure at least 30% less than a first buoyancy effect average per length of the structure provided by the first buoyant means.

In some embodiments, at least one of the first buoyancy means and the second buoyancy means comprises a foam about an exterior of the structure. In some embodiments, the means for lowering the first portion and the second portion comprises a tensioner. In some embodiments, at least one of the first buoyancy means and the second buoyancy means comprises a polymer foam about at least a portion of an exterior of the structure. In some embodiments, the apparatus also includes at least one of a skin, a pipe, and a rigid support exterior to the foam, adapted to provide additional strength for the foam. In some embodiments, the means for lowering the first portion and the second portion is installed on a vessel. In some embodiments, at least one of the first buoyancy means and the second buoyancy means provides at least 100 Newtons of buoyancy per meter of a portion of the structure about which the means is installed. In some embodiments, at least one of the first buoyancy means and the second buoyancy means provides at least 200 Newtons of buoyancy per meter of a portion of the structure about which the means is installed. In some embodiments, at least one of the first buoyancy means and the second buoyancy means provides at least 500 Newtons of buoyancy per meter of a portion of the structure about which the means is installed. In some embodiments, at least one of the first buoyancy means and the second buoyancy means is providing at least 50,000 Newtons of buoyancy. In some embodiments, at least one of the first buoyancy means and the second buoyancy means is providing at least 100,000 Newtons of buoyancy. In some embodiments, at least one of the first buoyancy means and the second buoyancy means is providing at least 500,000 Newtons of buoyancy. In some embodiments, at least one of the first buoyancy means and the second buoyancy means is providing at least 1,000,000 Newtons of buoyancy. In some embodiments, at least one of the first buoyancy means and the second buoyancy means is providing between 2,000,000 Newtons and 20,000,000 Newtons of buoyancy.

In some embodiments, a depth is calculated as a vertical drop from where the structure enters the surface of the water. In some embodiments, a depth is calculated as an average of the vertical drop from where the structure enters the surface of the water to the bottom, and a vertical rise to the surface from the point on the bottom where the structure rests.

In some embodiments, the structure is installed from a vessel in the J-lay configuration. In some embodiments, the structure is installed from a vessel in the S-lay configuration.

Those of skill in the art will appreciate that many modifications and variations are possible in terms of the disclosed embodiments, configurations, materials and methods without departing from their spirit and scope. Accordingly, the scope of the claims appended hereafter and their functional equivalents should not be limited by particular embodiments described and illustrated herein, as these are merely exemplary in nature.

THEORETICAL EXAMPLE

A)—A 8.625"×12.75" pipe-in-pipe oil flowline is installed from a vessel in a J-lay configuration, with a 7 degree top angle (from vertical), in 3000 meters of water. The vessel tensioner must provide 6780 kilonewtons (kN) of tension to support the flowline, if the flowline remains dry. If the flowline is flooded, the vessel tensioner must provide 8510 kN of tension to support the flowline.

B)—A 8.625"×12.75" pipe-in-pipe oil flowline with 15 cm of closed cell polyurethane foam extruded about the circumference of the flowline. The flowline is installed from a vessel in a J-lay configuration, with a 7 degree top angle (from vertical), in 3000 meters of water. The vessel tensioner must provide 5550 kilonewtons (kN) of tension to support the flowline, if the flowline remains dry. If the flowline is flooded, the vessel tensioner must provide 7240 kN of tension to support the flowline.

Results—Applying the foam to the flowline results in a reduction of the tensioner requirements of 15% in a flooded flowline, and a reduction of 18% in a dry flowline.

The invention claimed is:
1. A system comprising:
a structure in a body of water;
wherein the body of water comprises a depth comprising a top-section from a surface of the body of water to one-third of the depth, and a second-section from one-third of the depth to two-thirds of the depth;
a first buoyant apparatus attached to the structure in the top-section of the depth;
a second buoyant apparatus attached to the structure in the second-section of the depth;
wherein the second buoyant apparatus provides a second buoyancy effect average per length of the structure at least 30% less than a first buoyancy effect average per length of the structure provided by the first buoyant apparatus;

wherein at least one of the first buoyant apparatus and the second buoyant apparatus comprises a foam;

further comprising a skin exterior to the foam.

2. The system of claim 1, further comprising a vessel connected to the structure, wherein the vessel is floating in the body of water.

3. The system of claim 1, wherein the structure is selected from the group consisting of an oil flowline, a pipeline, a riser, and a steel tube.

4. The system of claim 1, wherein the foam comprises a polymeric foam.

5. The system of claim 4, further comprising a polymeric skin exterior to the foam.

6. The system of claim 1, wherein the structure comprises a plurality of sections welded to each other.

7. The system of claim 1, wherein the structure comprises a plurality of sections threaded to each other.

8. The system of claim 1, wherein at least one of the first buoyant apparatus and the second buoyant apparatus comprises foam having a thickness of at least 10 cm.

9. A method of installing a structure in a body of water comprising:

attaching a first buoyant apparatus to a first portion of the structure;

attaching a second buoyant apparatus to a second portion of the structure;

lowering the second portion into the body of water, wherein the body of water comprises a depth comprising a top-section from a surface of the body of water to one-third of the depth, and a second-section from one-third of the depth to two-thirds of the depth;

lowering the second portion into the second-section of the depth;

lowering the first portion into the top-section of the depth;

wherein the second buoyant apparatus provides a second buoyancy effect average per length of the structure at least 30% less than a first buoyancy effect average per length of the structure provided by the first buoyant apparatus;

wherein at least one of the first buoyant apparatus and the second buoyant apparatus comprises a foam;

further comprising a skin or a pipe exterior to the foam, the skin or the pipe adapted to provide additional strength to the foam.

10. The method of claim 9, wherein a top of the second-section depth is at least about 1000 meters.

11. The method of claim 9, wherein the structure is selected from the group consisting of an oil flowline, a pipeline, a riser, and a steel tube.

12. The method of claim 9, wherein at least one of the first buoyant apparatus and the second buoyant apparatus comprise a polyolefin foam having a thickness of at least about 15 cm.

13. The method of claim 9, wherein at least one of the first buoyant apparatus and the second buoyant apparatus comprises a foam having a thickness of at least about 20 cm.

14. The method of claim 9, wherein at least one of the first buoyant apparatus and the second buoyant apparatus comprises a foam having a thickness of at least about 30 cm.

15. The method of claim 12, further comprising a skin or a pipe exterior to the foam, the skin adapted to provide additional strength to the foam.

16. The method of claim 9, wherein at least a portion of the structure rests on a bottom of the body of water.

17. An apparatus for installing a structure in a body of water, comprising:

a means for attaching a first buoyant means to a first portion of the structure;

a means for attaching a second buoyant means to a second portion of the structure;

a means for lowering the second portion into the body of water, wherein the body of water comprises a depth comprising a top-section from a surface of the body of water to one-third of the depth, and a second-section from one-third of the depth to two-thirds of the depth;

a means for lowering the second portion into the second-section of the depth;

a means for lowering the first portion into the top-section of the depth;

wherein the second buoyant means provides a second buoyancy effect average per length of the structure at least 30% less than a first buoyancy effect average per length of the structure provided by the first buoyant means;

wherein at least one of the first buoyancy means and the second buoyancy means comprises a foam about an exterior of the structure;

further comprising at least one of a skin, a pipe, and a rigid support exterior to the foam, adapted to provide additional strength to the foam.

18. The apparatus of claim 17, wherein the foam comprises a polymeric foam about an exterior of the structure.

19. The apparatus of claim 17, wherein the means for lowering the first portion and the second portion comprises a tensioner.

20. The apparatus of claim 18, further comprising at least one of a skin, a pipe, and a rigid support exterior to the foam, adapted to provide additional strength for the foam.

21. The apparatus of claim 17, wherein the means for lowering the first portion and the second portion is installed on a vessel.

22. The apparatus of claim 17, wherein at least one of the first buoyancy means and the second buoyancy means provides at least 100 Newtons of buoyancy per meter of a portion of the structure about which the means is installed.

23. The apparatus of claim 17, wherein at least one of the first buoyancy means and the second buoyancy means provides at least 200 Newtons of buoyancy per meter of a portion of the structure about which the means is installed.

24. The apparatus of claim 17, wherein at least one of the first buoyancy means and the second buoyancy means provides at least 500 Newtons of buoyancy per meter of a portion of the structure about which the means is installed.

25. The apparatus of claim 17, wherein at least one of the first buoyancy means and the second buoyancy means is providing at least 50,000 Newtons of buoyancy.

26. The apparatus of claim 17, wherein at least one of the first buoyancy means and the second buoyancy means is providing at least 100,000 Newtons of buoyancy.

27. The apparatus of claim 17, wherein at least one of the first buoyancy means and the second buoyancy means is providing at least 500,000 Newtons of buoyancy.

28. The apparatus of claim 17, wherein at least one of the first buoyancy means and the second buoyancy means is providing at least 1,000,000 Newtons of buoyancy.

29. The apparatus of claim 17, wherein at least one of the first buoyancy means and the second buoyancy means is providing between 2,000,000 Newtons and 20,000,000 Newtons of buoyancy.

* * * * *